United States Patent
Takahashi et al.

(10) Patent No.: US 6,760,681 B2
(45) Date of Patent: Jul. 6, 2004

(54) RATE DETECTION METHOD AND RATE DETECTOR

(75) Inventors: Tomohiko Takahashi, Kanagawa (JP); Yoshiaki Yoshioka, Kanagawa (JP); Tetsuya Iwasaki, Tokyo (JP)

(73) Assignee: Nissan Motor Co., Ltd., Yokohama (JP)

( * ) Notice: Subject to any disclaimer, the term of this patent is extended or adjusted under 35 U.S.C. 154(b) by 131 days.

(21) Appl. No.: 10/204,626

(22) PCT Filed: Mar. 1, 2002

(86) PCT No.: PCT/JP02/01892
§ 371 (c)(1),
(2), (4) Date: Aug. 22, 2002

(87) PCT Pub. No.: WO02/070994
PCT Pub. Date: Sep. 12, 2002

(65) Prior Publication Data
US 2003/0149541 A1 Aug. 7, 2003

(30) Foreign Application Priority Data
Mar. 2, 2001 (JP) .......................... 2001-058579

(51) Int. Cl.[7] .............................................. G06F 15/00
(52) U.S. Cl. .......................... 702/145; 702/75; 702/79
(58) Field of Search ........................... 702/75, 79, 145, 702/147; 701/1; 324/143, 166

(56) References Cited

U.S. PATENT DOCUMENTS

| | | | |
|---|---|---|---|
| 4,566,069 A | | 1/1986 | Hirayama et al. |
| 5,305,220 A | | 4/1994 | Schöggl |
| 5,315,536 A | * | 5/1994 | Murase et al. ................. 702/79 |
| 6,219,624 B1 | * | 4/2001 | Russ .......................... 702/75 |
| 6,328,007 B1 | | 12/2001 | Hirasawa et al. |
| 6,598,007 B2 | * | 7/2003 | Moizio et al. .............. 702/145 |

FOREIGN PATENT DOCUMENTS

| | | |
|---|---|---|
| EP | 0 401 757 | 12/1990 |
| EP | 0 508 437 | 10/1992 |
| GB | 2 134 265 | 8/1984 |
| JP | 54-058115 | 5/1979 |
| JP | 11-351050 | 12/1999 |
| JP | 2001-050091 | 2/2001 |

* cited by examiner

Primary Examiner—John Barlow
Assistant Examiner—Stephen J. Cherry
(74) Attorney, Agent, or Firm—Foley & Lardner LLP

(57) ABSTRACT

A stream of pulses related to rotation rate drives an interrupt to store first timer values of a first timer and to set a second timer to run from zero. At predetermined fixed time intervals, second timer values of the second timer are stored. The stored first timer values are sampled to determine a first rate related to the input stream. The stored second timer values are sampled to determine a second rate. The first and second rates are selectively used as a final rotation rate related to the input stream.

19 Claims, 11 Drawing Sheets

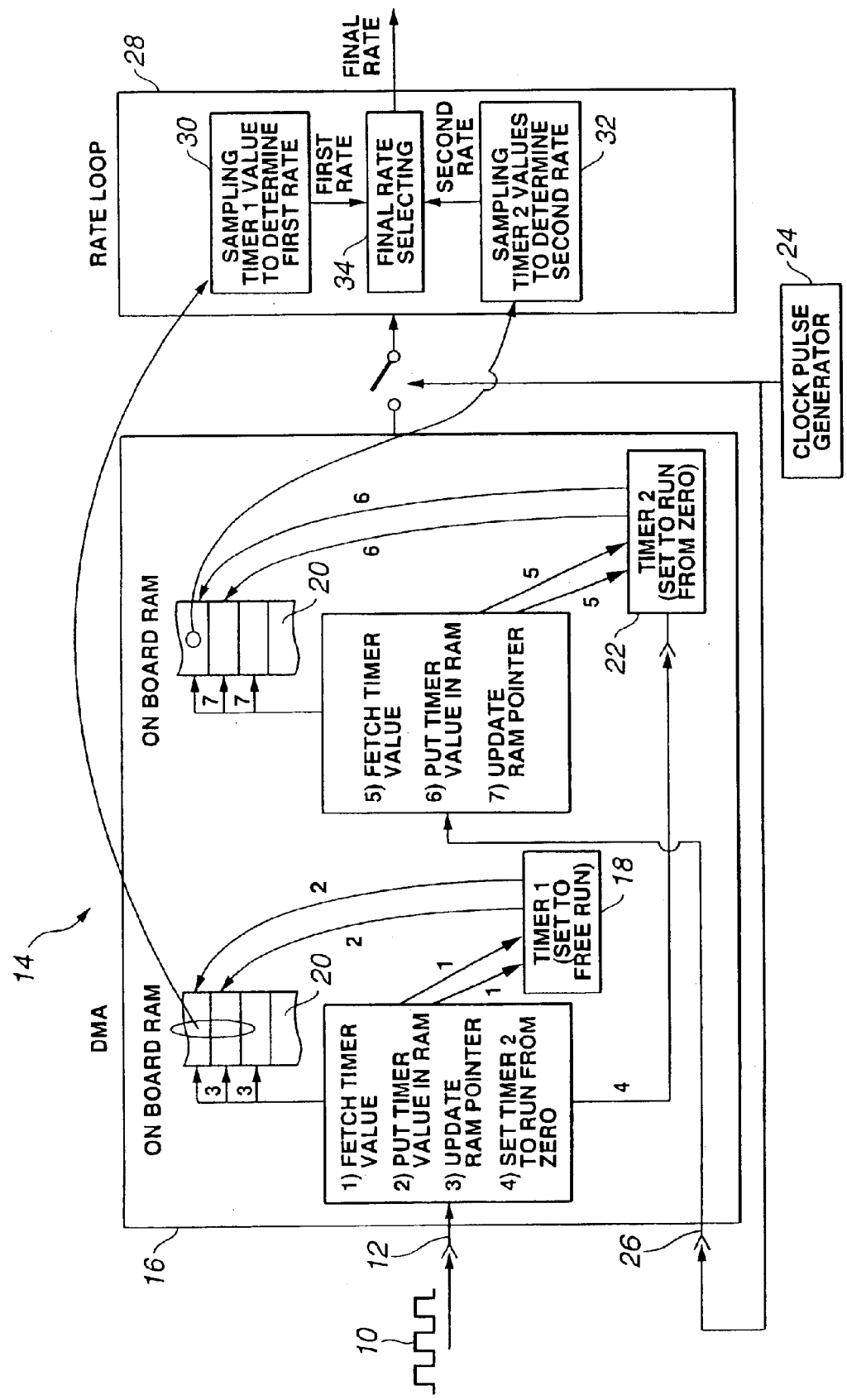

RATE DETECTION METHOD AND RATE DETECTOR

BACKGROUND OF THE INVENTION

The present invention relates to a rate detection method and a rate detector.

Engine control generally includes sensing the current state of the engine crankshaft (e.g., crankshaft position or crankshaft velocity). Many engine control systems using digital signal processors (DSPs) require acquisition of information from a digital transducer. The information from a transducer such an encoder is in the form of a digital pulse stream and represents the position of the mechanism under control. The frequency of this pulse stream is dictated by the speed of the mechanism under control (as measured by the transducer).

The frequency range of this position pulse stream from the transducer can be very large. In many engine control applications, it is necessary to measure crankshaft velocity information so that digital control algorithms, such as a control algorithm for in-cylinder air mass calculation, can use the information to compute the required control functions. However, currently available technique is not satisfactory in providing the velocity information using the position pulse stream when the engine operates in an operating region of very low engine speeds and/or in an operating region where the engine is about to stall.

Hence, a technique that allows for the compensation for such insufficiency of the currently available technique is highly desirable.

SUMMARY OF THE INVENTION

An object of the present invention is to provide a rate detection method and/or a rate detector, which allow for the compensation for the above-mentioned insufficiency of currently available technique of processing an input stream of asynchronous pulses dictated by the speed of mechanism under control.

One of exemplary embodiments according to the present invention provides timer handling in timed with asynchronous digital data acquisition plus periodic sampling of the timer value and the acquired data for analysis and output.

Another of such exemplary embodiments according to the present invention provides asynchronous digital data acquisition of two different digital data, and periodic sampling of selected one of the two different digital data for analysis and output.

According to one alternative aspect of the present invention, there is provided a rate detection method, comprising:

generating interrupts in response to an input stream;

storing first timer values of a first timer in response to said interrupts;

setting a second timer to run from zero in response to said interrupts;

sampling said stored first timer values to determine a first rate related to said input stream;

sampling second timer value of said second timer to determine a second rate; and creating a final rate related to said input stream based on said first and second stream.

According to another alternative aspect of the present invention, there is provided a rate detection method, comprising:

generating first interrupts in response to a first input stream;

generating second interrupts in response to a second input stream;

storing first timer values in response to said first interrupts;

storing second timer values in response to said second interrupts;

executing a first routine, when selected, which includes sampling said stored first timer values to determine a first rate related to said first input stream as a final rotation rate;

executing a second routine, when selected, which includes sampling said stored second timer values to determine a second rate related to said second input stream as said final rotation rate; and selecting one of said first and second routines.

According to still another alternative aspect of the present invention, there is provided a rate detector for a rotation device, comprising:

a source outputting a stream of pulses related to rotation rate of a rotation device; and a programmable signal processor with interrupt input coupled to output of said source, said signal processor being programmed to store first timer values of a first timer in response to said interrupts;

set a second timer to run from zero in response to said interrupts;

sample said stored first timer values to determine a first rate related to said input stream;

sample second timer value of said second timer to determine a second rate; and create a final rate related to said input stream based on said first and second rates.

According to a further alternative aspect of the present invention, there is provided a rate detector for a rotation device, comprising:

a source outputting a stream of first pulses related to rotation rate of a rotation device;

a rotation sensor coupled to said rotation device, said rotation sensor outputting a stream of second pulses related to rotation rate of said rotation device;

a programmable signal processor with first interrupt input coupled to output of said source and also with second interrupt input coupled to output of said rotation sensor, said signal processor being programmed to:

store first timer values in response to said first interrupts;

store second timer values in response to said second interrupts;

execute a first routine, when selected, which includes sampling said stored first timer values to determine a first rate related to said first input stream as a final rotation rate;

execute a second routine, when selected, which includes sampling said stored second timer values to determine a second rate related to said second input stream as said final rotation rate; and select one of said first and second routines.

BRIEF DESCRIPTION OF THE DRAWINGS

Further objects and advantages of the invention will be apparent from reading of the following description in conjunction with the accompanying drawings.

FIG. 1 shows one exemplary embodiment according to the present invention in functional format.

DESCRIPTION OF THE EXEMPLARY EMBODIMENTS

Figures 2A, 2B:
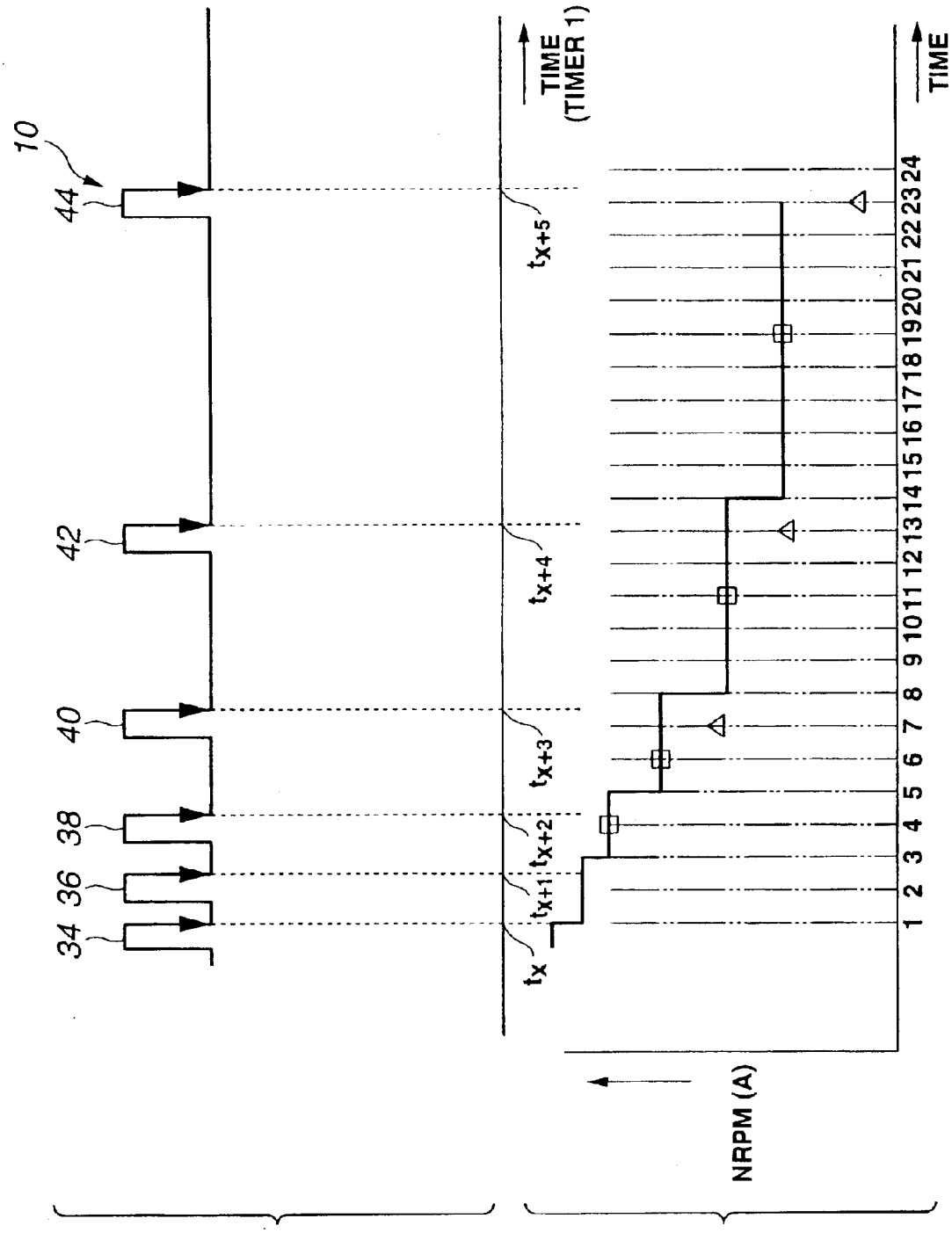
FIG. 2A shows asynchronous data acquisition in response to interrupts generated by an input stream of pulses to store timer values of a first timer.
FIG. 2B shows periodic determination of a first rate as a function of an interval (difference) between the last one and one before the last of periodically sampled stored first timer values.

The exemplary embodiments provide an asynchronous to synchronous interface as part of rate detection from a position signal. FIG. 1 illustrates the use of direct memory access (DMA) and timers in a digital signal processor (DSP) to asynchronously acquire times of a first timer and handle a second timer and synchronously acquire times of the second timer, and synchronously compute first and second rates that are used to create a final rate. In particular, a stream of position pulses 10 is input to a first interrupt input 12 of a digital processor 14 (e.g., a DSP with on-board memory) to handle the interrupt via DMA 16 by (1) fetching the time of the interrupt from a first timer 18, (2) storing this time in a memory (e.g., RAM 20) location, (3) incrementing the memory location pointer and (4) setting a second timer 22 to run from zero. A stream of timing pulses determined as a function of clock pulses from a clock pulse generator 24 is input to a second interrupt input 26 of DSP 14 to handle the interrupt via DMA 16 by 5) fetching the time of the interrupt from second timer 22, 6) storing this time in a memory location of RAM 20 and 7) incrementing the memory location pointer. Using rate loop 28, a first rate NRPM(A) is periodically determined or computed, at a block 30, by periodically sampling the present memory location pointer and corresponding first timer value, and by sampling the preceding memory location and corresponding first timer value. At block 30, an interval TREF between the sampled two first timer values is computed and first rate NRPM(A) is determined as the product of the constant K and the reciprocal of TREF. This relationship may be expressed as $$NRPM(A) = \frac{K}{TREF} \quad (1)$$

where: K is the constant.

As is well known to one ordinary skill in the art, this function decreases monotonically for $0<TREF<+\infty$. Simultaneously, using rate loop 28, a second rate NRPM(B) is periodically determined or computed, at a block 32, by sampling the present memory location pointer and corresponding second timer value Tc. At block 32, second rate NRPM(B) is determined as the product of the constant K and the reciprocal of Tc. This relationship may be expressed as $$NRPM(B) = \frac{K}{T_c} \quad (2).$$

Simultaneously, using rate loop 28, a final pulse rate NRPM is created based on first and second rates NRPM(A) and NRPM(B) at block 34, for example, by selectively using first and second rates NRPM(A) and NRPM(B) as final rate NRPM. This selection is performed in a manner to reduce the difference between first rate NRPM(A) and the desired rate.

FIG. 1 shows the use of first timer 18 for detecting the time of position pulse 10 and second timer 22 for detecting the elapse of time from the preceding position pulse. First timer 18 is set to free run. Second timer 22 is set to run from zero.

FIG. 2A shows asynchronous data acquisition in response to interrupts generated by position pulses 34, 36, 38, 40, 42 and 44 to store first timer values $t_x$, $t_{x+1}$, $t_{x+2}$, $t_{x+3}$, $t_{x+4}$ and $t_{x+5}$ of first timer 18. FIG. 2B shows periodic sampling of the acquired timer values and periodic computation of first rate NPRM(A) for 24 times in response to interrupts generated by stream of timing pulses. Times of 24 interrupts are labeled by 1 to 24, respectively, below the horizontal line representing time.

Figures 3A, 3B:
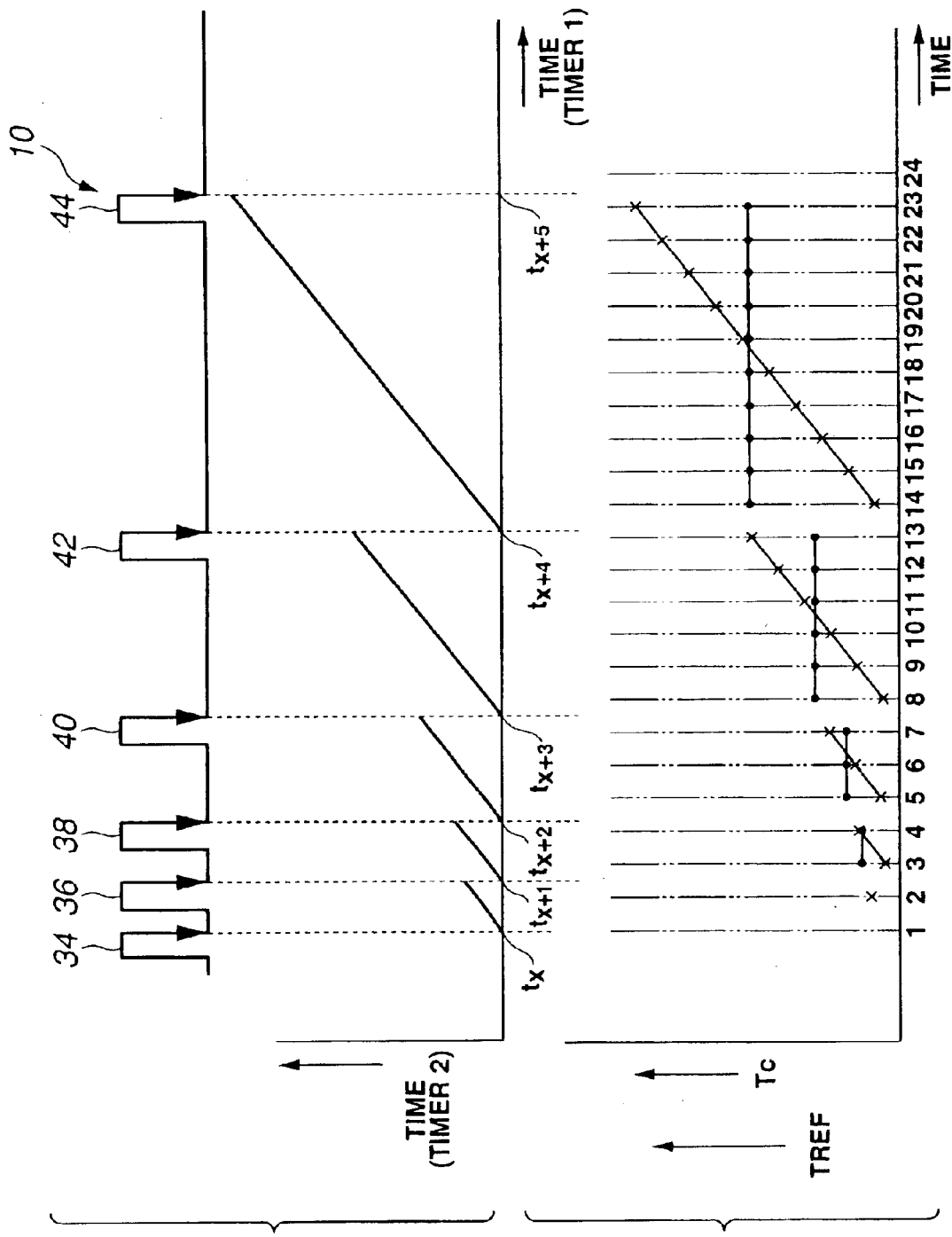
FIG. 3A shows asynchronous handling of a second timer in response to the interrupts and the timer content.
FIG. 3B shows periodic sampling of timer values of the second timer, as represented by x marks, together with computed values of interval between the periodically sampled first timer values, as represented by circular dots.

FIG. 3A shows asynchronous setting of second timer 22 to run from zero in response to interrupts generated by position pulses 34, 36, 38, 40, 42 and 44. The content of second timer 22 is the elapse of time from the preceding pulse of input stream 10. FIG. 3B shows periodic sampling of second timer values Tc as represented by x marks. Also shown in FIG. 3B are computed values of interval TREF, as represented by dots, between periodically sampled first timer values.

With reference to FIG. 3B, the circular dots represent computed values of intervals TREF. At each of interrupts 3 and 4, two stored first timer values $t_{x+1}$ and $t_x$ are sampled to compute a first value of interval Tc. At each of interrupts 5, 6 and 7, two stored first timer values $t_{x+2}$ and $t_{x+1}$ are sampled to compute a second value of interval Tc. At each of interrupts 8, 9, 10, 11, 12 and 13, two stored first timer values $t_{x+3}$ and $t_{x+2}$ are sampled to compute a third value of interval Tc. At each of interrupts 14, 15, 16, 17, 18, 19, 20, 21, 22 and 23, two stored first timer values $t_{x+4}$ and $t_{x+3}$ are sampled to compute a fourth value of interval Tc. It is noted that the computed value of interval Tc remains unaltered after each of position pulses until the interruption immediately after the subsequent position pulse. Using the equation (1), values of first rate NPRM(A) are periodically computed. The computed values of first rate NRPM(A) are plotted in FIG. 2B and interconnected by line. First rate NRPM(A) provides velocity information of a rotation device under control with good accuracy unless interval TREF between two subsequent pulses is too long. If interval TREF is too long, as is the case from the interrupt 8 and onwards in FIGS. 2A and 2B, velocity information provided by first rate NRPM(A) cannot be used to compute the required control function. This is where second rate NRPM(B) is used to compensate for such insufficiency of first rate NRPM(A).

With continuing reference to FIG. 3B, the x marks represent second timer values Tc due to periodic sampling of second timer 22. Apparently, the second timer values Tc increases from near zero for the subsequent interrupts 3 and 4, for the subsequent interrupts 5, 6 and 7, for the subsequent interrupts 8, 9, 10, 11, 12 and 13, and for the subsequent interrupts 14, 15, 16, 17, 18, 19, 20, 21, 22 and 23. As equation (2) clearly states, second rate NRPM(B) decreases monotonically for $0<Tc<+\infty$. Comparing equation (2) with equation (1) clearly reveals that second rate NRPM(B) is equal to first rate NRPM(A) when second timer value Tc is equal to interval TREF. In FIG. 3B, at interrupts 4, 6, 11 and 19, second timer values Tc may be regarded as equal to computed values of interval TREF, respectively. This means that, at such interrupts, computed values of second rate NRPM(B), as represented by squares in FIG. 2B, become equal to computed values of first rate NRPM(A), respectively. In FIG. 3B, second timer value Tc at interrupt 7 may be regarded as equal to computed value of interval TREF at the subsequent interrupt 8. Similarly, second timer value Tc at interrupt 13 may be regarded as equal to computed value of interval TREF at the subsequent interrupt 14. Further, second timer value Tc at interrupt 23 may be regarded as equal to computed value of interval TREF at the subsequent interrupt 24. This means that computed values of second rate NRPM(B), as represented by triangles in FIG. 2B, at interrupts 7, 13 and 24 become equal to computed values of first rate NRPM(A) at the subsequent interrupts 8, 14 and 24, respectively. Apparently from equation (2), computed value of second rate NRPM(B) at interrupt 12 lies in a monotonically decreasing line interconnecting the computed value at interrupt 11, represented by the square, and the computed value at interrupt 13, represented by the triangle. Similarly, computed values of second rate NRPM(B) at interrupts 20, 21 and 22 lie in a monotonically decreasing line interconnecting the computer value at interrupt 19, represented by the square, and the computer value at interrupt 23, represented by the triangle.

Turning back to FIG. 1, at block 34 in rate loop 28, the above mentioned computed values of second rate TRPM(B) represented by squares and triangles in FIG. 2B and their intermediate values, if available, are used as final rate TRPM instead of the computed values of first rate TRPM(A). The final rate TRPM created in the above discussed manner based on the first and second rates TRPM(A) and TRPM(B) provides velocity information with better accuracy.

Figure 4:
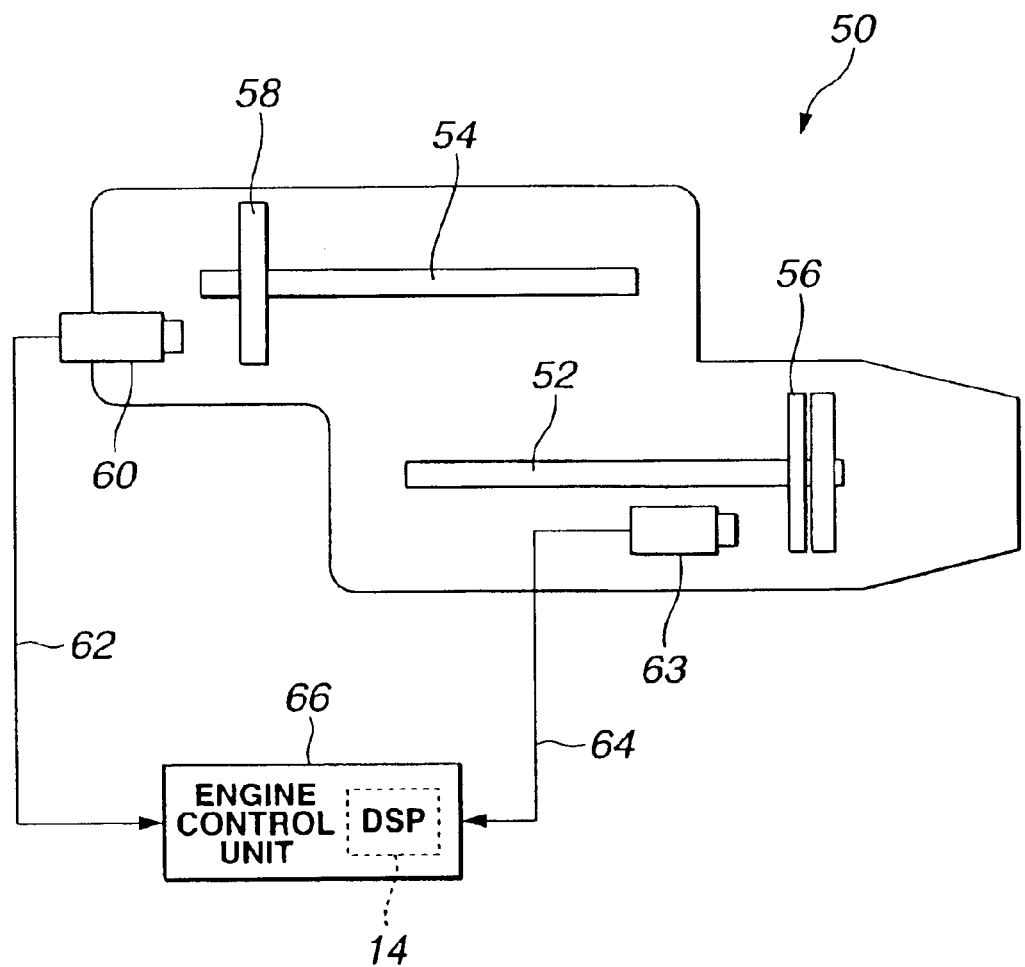
FIG. 4 illustrates a portion of an engine control system implementing the present invention.
Figure 5:
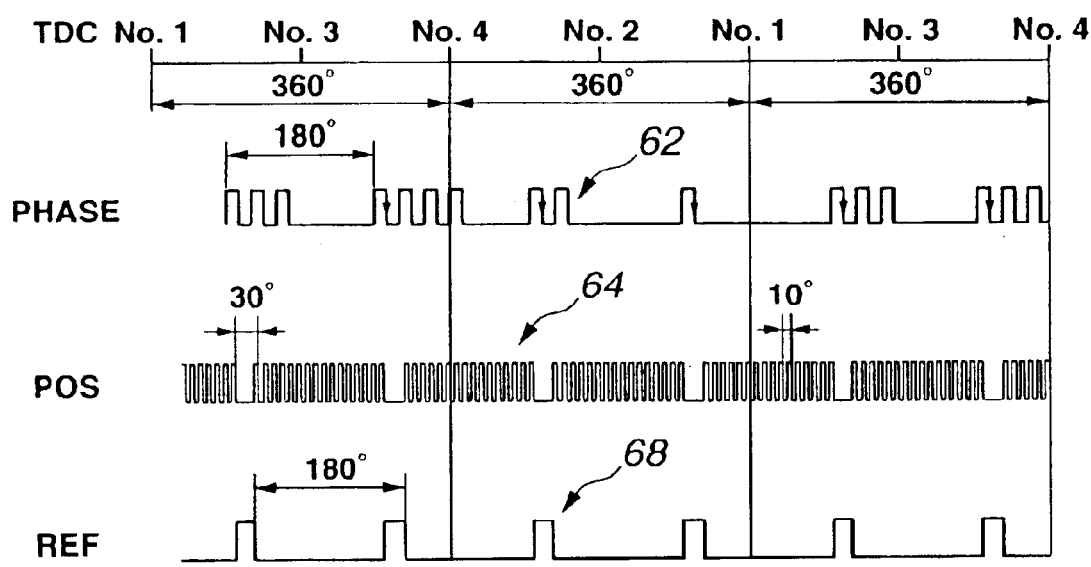
FIG. 5 illustrates outputs of rotation sensors coupled to a rotation device in the form of a four-cylinder internal combustion engine and a stream of reference pulses used to generate interrupts.

FIG. 4 shows a portion of an engine control system for a four-cylinder internal combustion engine 50 including a crankshaft 52 and a camshaft 54. In particular, engine 50 drives crankshaft 52 that, in turn, drives camshaft 54 at a speed half as much as the crankshaft speed. Crankshaft 52 drives a signal wheel 56 fixedly coupled thereto. Camshaft 54 drives a signal wheel 58. A phase sensor 60 provides a pulse stream 62 as shown in FIG. 5. Pulse stream 62 includes four different groups of pulses per one rotation of signal wheel 58 of camshaft 54. Each pulse group of pulse stream 62 has a leading pulse appearing at 60° BTDC of the corresponding one of the engine cylinders. A position sensor 63 provides a pulse stream 64 as shown in FIG. 5. Pulse stream 64 includes a group of sixteen 10° pulses per one half rotation of signal wheel 56 of crankshaft 52 so that the group of pulses appears twice per one rotation of signal wheel 56 with an interval over rotation through 30°. Specifically, such interval appears once per one half rotation of signal wheel 56. The pulse streams 62 and 64 are analyzed in an engine control unit 66 to detect a reference position at 100° BTDC of each of four cylinders and generate a reference (REF) pulse. As shown in FIG. 5, a stream of REF pulses 68 includes a REF pulse per one half rotation of crankshaft 52. The REF pulse stream 68 is used as the input stream 10 of DSP 14 explained before in FIG. 1. In FIG. 4, such DSP is indicated by a rectangular block illustrated by broken line at 14.

With reference also to FIG. 1, the stream of REF pulses 68 is input to a first interrupt input 12 of DSP 14 to handle the interrupt via DMA 16 by (1) fetching the time of the interrupt from a first timer 18, (2) storing this time in a memory (e.g., RAM 20) location, (3) incrementing the memory location pointer and (4) setting a second timer 22 to run from zero. A stream of timing pulses determined as a function of clock pulses from a clock pulse generator 24 is input to a second interrupt input 26 of DSP 14 to handle the interrupt via DMA 16 by 5) fetching the time of the interrupt from second timer 22, 6) storing this time in a memory location of RAM 20 and 7) incrementing the memory location pointer. Using rate loop 28, a first rotation rate NRPM(A) (or first engine speed) is periodically determined or computed, at a block 30, by periodically sampling the present memory location pointer and corresponding first timer value, and by sampling the preceding memory location and corresponding first timer value. At block 30, an interval TREF between the sampled two first timer values is computed and first rate NRPM(A) is determined by computing an equation expressed as $$NRPM(A)=(60\times1000/TREF)\times(180/360) \quad (3).$$

Simultaneously, using rate loop 28, a second rotation rate NRPM(B) is periodically determined or computed, at a block 32, by sampling the present memory location pointer and corresponding second timer value Tc. At block 32, second rate NRPM(B) is determined by computing an equation expressed as $$NRPM(B)=(60\times1000/Tc)=(180/360) \quad (4).$$

Figure 6:
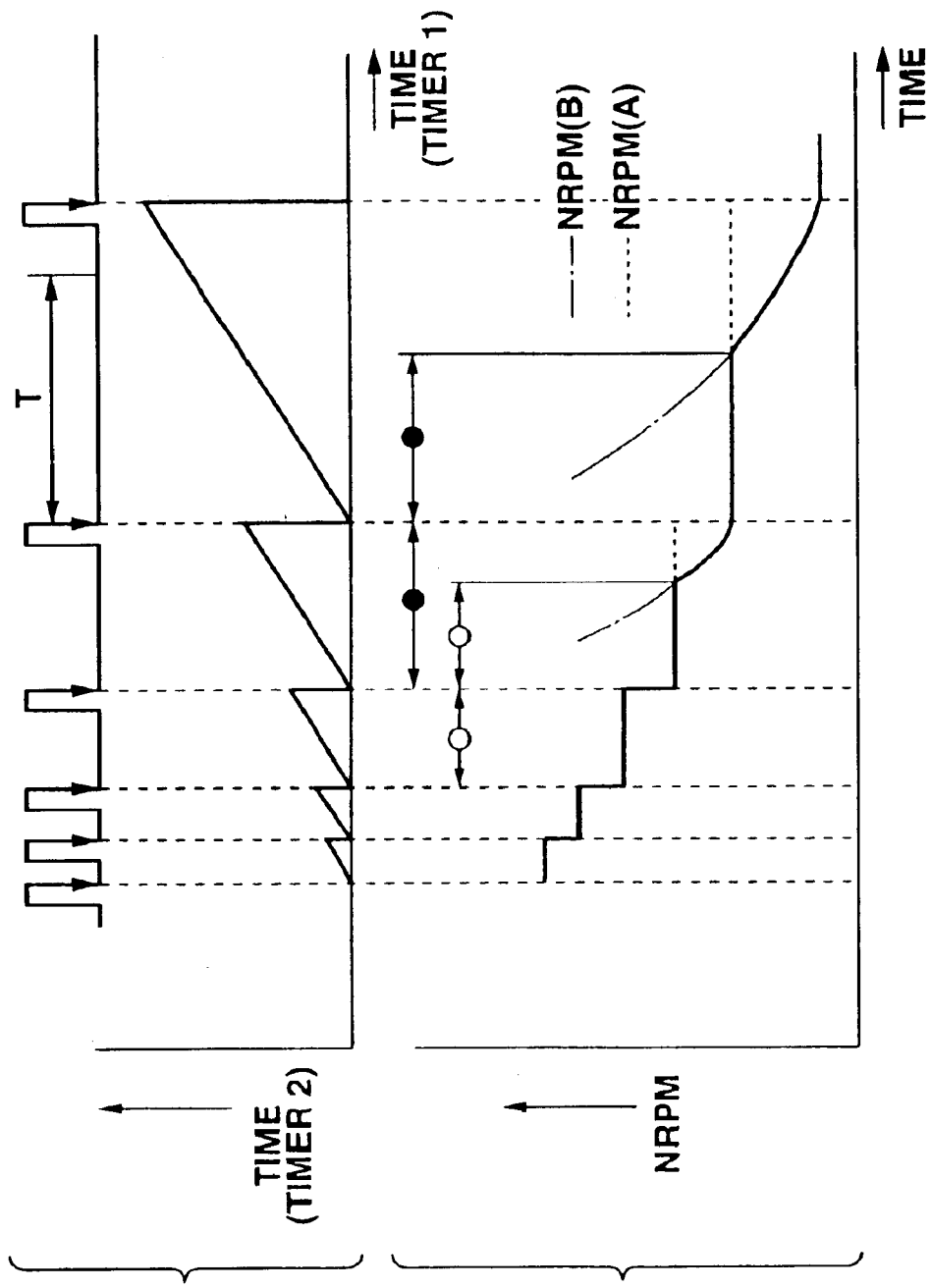
FIG. 6A is a similar view to FIG. 3A, showing asynchronous handling of second timer in response to the interrupts and the timer content.
FIG. 6B is a similar view to FIG. 2B, showing a final rotation rate.
Figure 7:
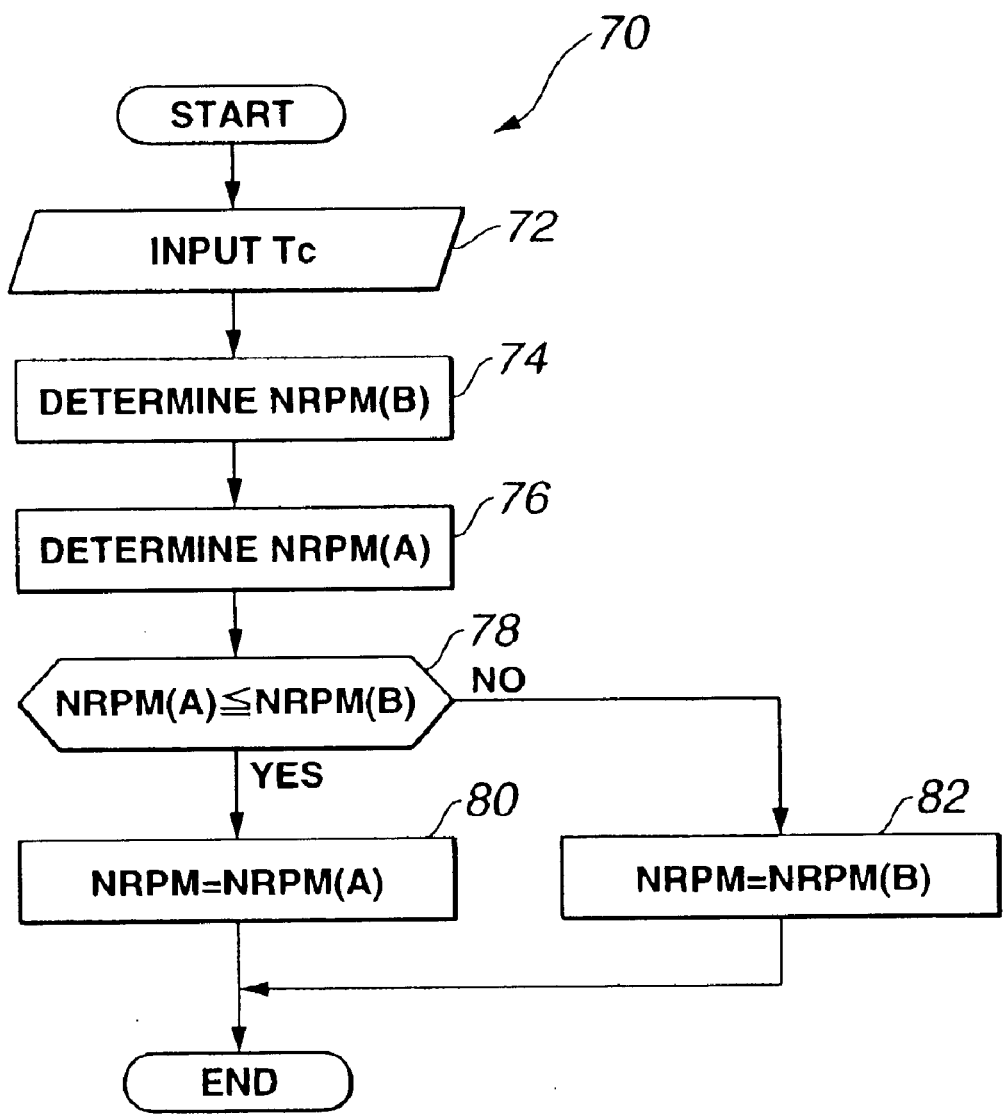
FIG. 7 is a flow diagram illustrating logic used to create the final rotation rate based on the first and second rates.

Simultaneously, using rate loop 28, a final rotation rate NRPM (or final engine speed) is created based on first and second rates NRPM(A) and NRPM(B) at block 34 in a manner as illustrated in FIG. 6B by periodically executing a control routine 70 as illustrated in FIG. 7.

With reference now to FIG. 7, control routine 70 is executed at regular intervals of 10 milliseconds.

In FIG. 7, at block 72, interval Tc is input. At block 74, second rotation rate NRPM(B) is determined. At block 76, first rotation rate NRPM(A) is determined. At block 78, the first and second rotation rates NRPM(A) and NRPM(B) are compared to each other to determine whether or not NRPM (A) is less than or equal to NRPM(B). If this is the case (YES), the routine proceeds to block 80. At block 80, first rotation rate NRPM(A) is set as final rotation rate NRPM. If, at block 78, NRPM(A) is greater than NRPM(B), the routine proceeds to block 82. At block 82, second rotation rate NRPM(B) is set as final rotation rate NRPM.

From the preceding description, it should be appreciated that the rate detector provides accurate velocity information even if period of input pulse stream gradually becomes long when the engine is being decelerated at low speeds. If the next pulse does not appear within a predetermined period of time T (see FIG. 6A), engine control unit 66 determines that the engine has come to a stall. According to the exemplary embodiment, as will be appreciated FIG. 6B, the rate detector keeps on providing accurate velocity information even after the determination that the engine has stopped.

Figure 8:
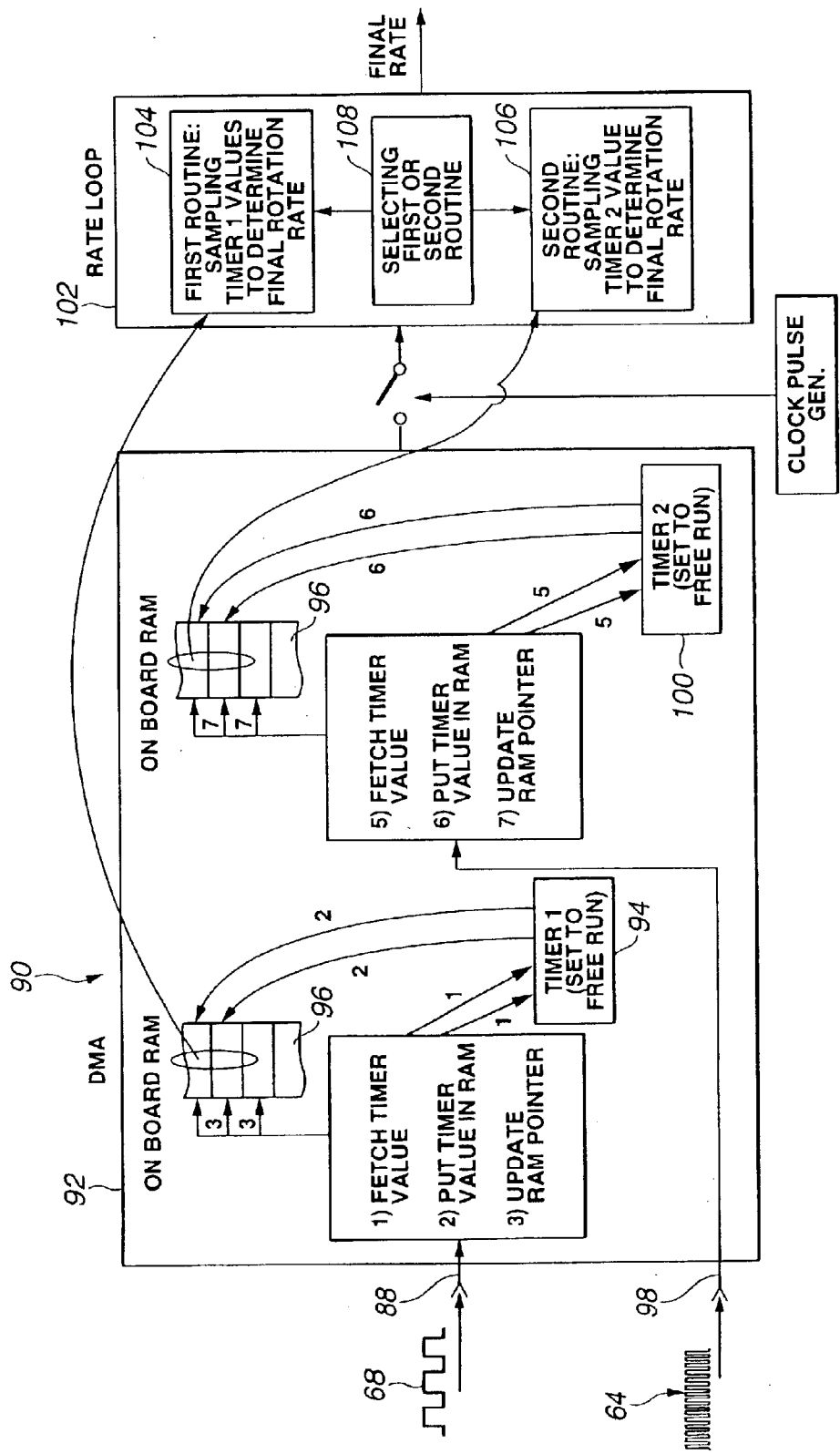
FIG. 8 shows another exemplary embodiment according to the present invention in functional format.

FIG. 8 illustrates the use of a DMA and timers in a DSP to asynchronously acquire times of first and second timers, and synchronously compute first and second rates that are used to create a final rate. In particular, a REF pulse stream 68 is input to a first interrupt input 88 of a digital processor 90 (e.g., a DSP with on-board memory) to handle the interrupt via DMA 92 by (1) fetching the time of the interrupt from a first timer 94, (2) storing this time in a memory (e.g., RAM 96) location, and (3) incrementing the memory location pointer. A POS pulse stream 64 is input to a second interrupt input 98 of DSP 90 to handle the interrupt via DMA 92 by 5) fetching the time of the interrupt from a second timer 100, 6) storing this time in a memory location of RAM 96 and 7) incrementing the memory location pointer. Using rate loop 102, two routines are selectively executed to provide a final rotation rate NRPM. When it is selected, a first routine is periodically executed at a block 104. In the first routine, a first rotation rate NRPM(A) is periodically determined or computed to provide final rotation rate NRPM, by periodically sampling the present memory location pointer and corresponding first timer value, and by sampling the preceding memory location and corresponding first timer value. At block 104, an interval TREF between the sampled two first timer values is computed and first rate NRPM(A) is determined by computing equation (3). When it is selected, a second routine is periodically executed at a block 106. In the second routine, a second rotation rate NRPM(C) is periodically determined or computed to provide final rotation rate NRPM, by periodically sampling the present memory location pointer and corresponding second timer value, and by sampling the preceding memory location and corresponding second timer value. At block 104, an interval TPOS between the sampled two second timer values is computed and second rate NRPM(C) is determined by computing equation expressed as $$NRPM(C) = (60 \times 1000/TPOS) \times (10/360) \quad (5).$$

The selection between the first and second routines is made at a block 108 to compensate for insufficiency of first rotation rate NRPM(A) as final rotation rate NRPM by second rotation rate NRPM(C) without any considerable increase on CPU computation.

Figure 9A:
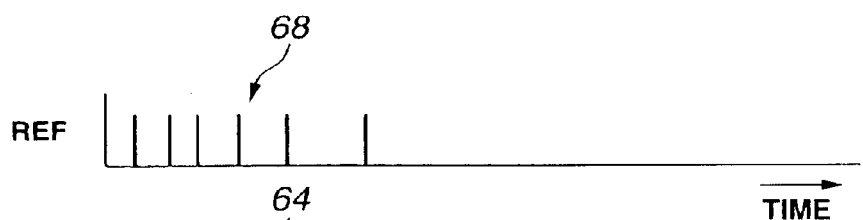
FIG. 9A is a similar view to FIG. 2A, showing asynchronous data acquisition in response to interrupts generated by an input stream of first pulses to store timer values of a first timer.
Figure 9B:
FIG. 9B is a similar view to FIG. 2A, showing asynchronous data acquisition in response to interrupts generated by an input stream of second pulses to store timer values of a second timer.
Figure 9C:
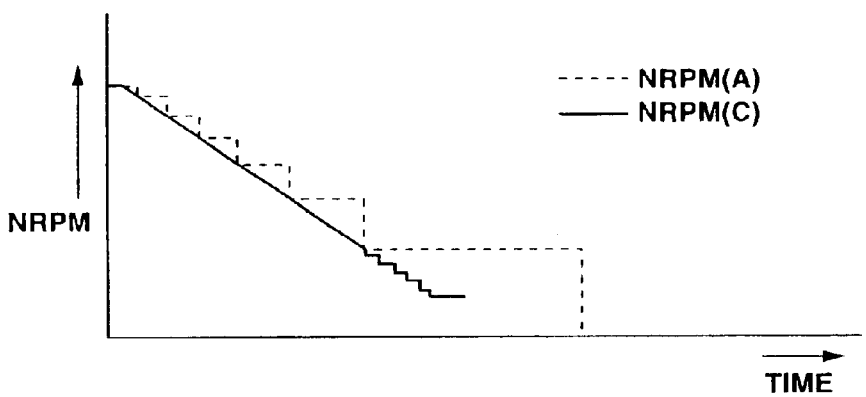
FIG. 9C is a similar view to FIG. 6B, showing a final rotation rate.

FIGS. 9A, 9B and 9C illustrate the variations when the engine is being decelerated at very low speeds. Under such operating condition, the second range is selected to use the second rotation rate NRPM(C) as final rotation rate NRPM. Various kinds of logic, which may be used to make such selection, are later described in connection with FIGS. 10 to 12.

In the exemplary embodiment, POS pulse stream 64 has a 10° pulse per 10/360 rotation and interval TPOS between the two pulses is used to provide the second rotation rate NRPM(C). In the case where a POS pulse stream has a 1° pulse per 1/360 rotation. In this case, the number of pulses per unit time is used to compute the second rotation rate.

Figure 10:
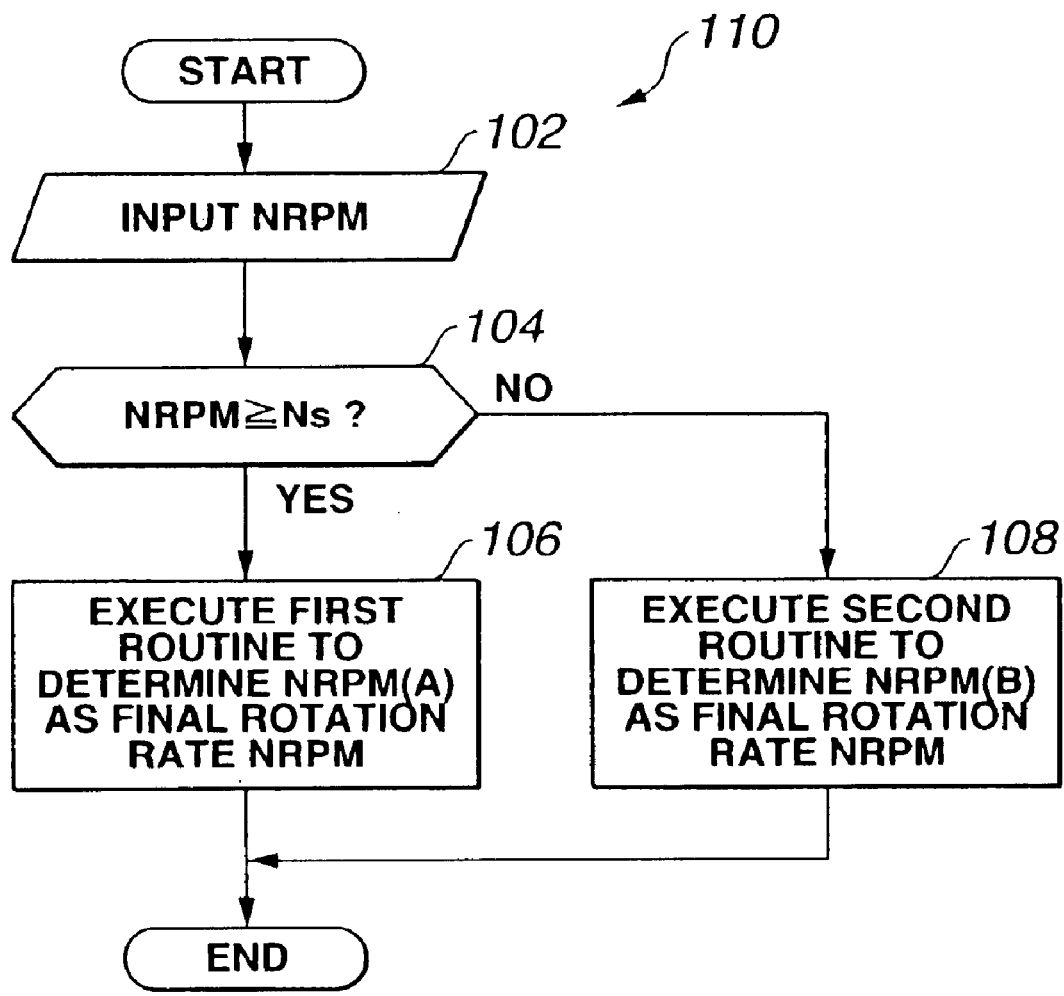
FIG. 10 is a flow diagram illustrating logic used to create the final rotation rate based on selective use of a first routine to determine the first rate and a second routine to determine the second rate.

With reference now to FIG. 10, control routine 110 is executed at regular intervals of 10 milliseconds.

In FIG. 10, at block 102, final rotation rate NRPM is input. At block 104, final rotation rate NRPM is compared to a threshold Ns(Ns=200 rpm) to determine whether or not NRPM is greater than or equal to Ns. If this is the case (YES), the routine proceeds to block 106. At block 106, the first routine is executed to determine first rotation rate NRPM(A) as final rotation rate NRPM. If, at block 104, NRPM is less than Ns, the routine proceeds to block 108. At block 108, the second routine is executed to determine second rotation rate NRPM(C) as final rotation rate NRPM. Accounting for the fact that first rotation rate NRPM(A) provides sufficiently accurate velocity information wen the engine is operating at speeds above 200 rpm, threshold Ns is established. Extending the use of second rotation rate NRPM(C) toward higher speeds beyond 200 rpm may increase CPU computation.

Figure 11:
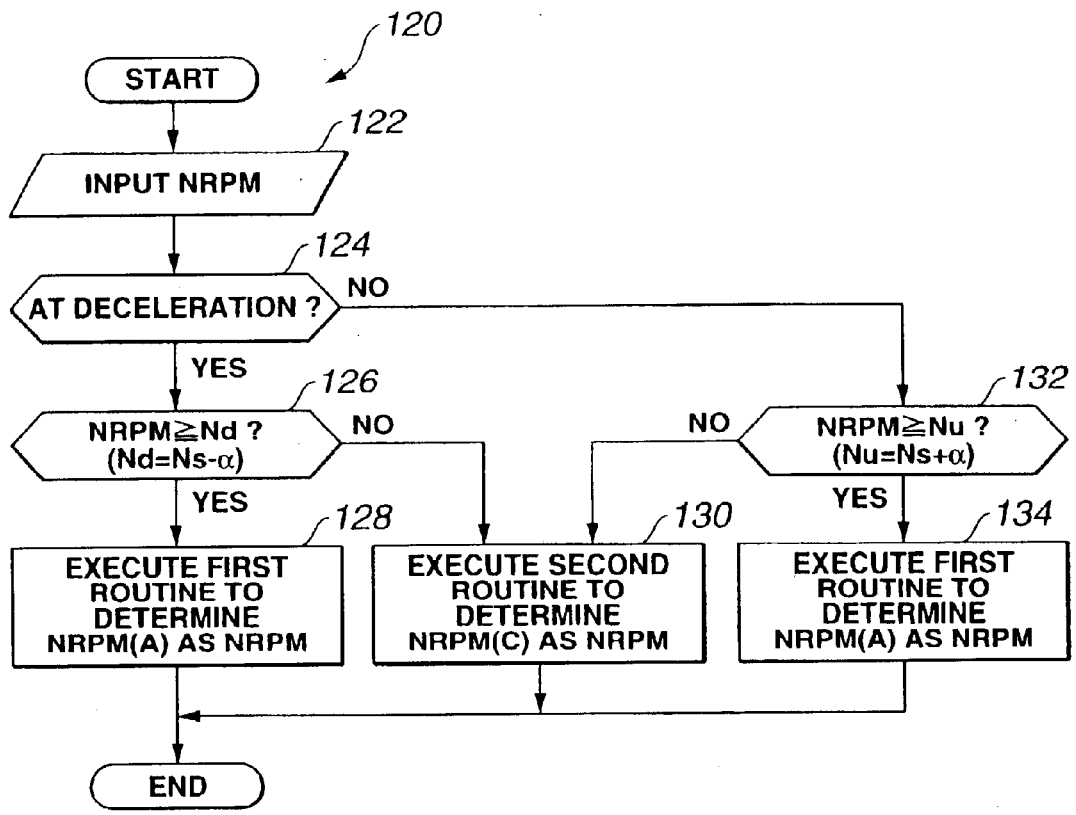
FIG. 11 is a flow diagram illustrating logic used to create the final rotation rate based on selective use of the first and second routines.

With reference to FIG. 11, control routine 120 is executed at regular intervals of 10 milliseconds.

In FIG. 11, at block 122, final rotation rate NRPM is input. At block 124, it is determined whether or not the engine is operating at deceleration. If this is the case (YES), the routine proceeds to block 126. At block 126, final rotation rate NRPM is compared to a down threshold Nd to determine whether or not NRPM is greater than or equal to Nd. The down threshold Nd is expressed as Nd=Ns−α (where; Ns=200 rpm, and α is the constant). If this is the case (YES), the routine proceeds to block 128. At block 128, the first routine is executed to determine first rotation rate NRPM(A) as final rotation rate NRPM. If, at block 126, NRPM is less than Nd, the routine proceeds to block 130. At block 130, the second routine is executed to determine second rotation rate NRPM(C) as final rotation rate NRPM. If, at block 124, it is determined that the engine is not at deceleration, the routine proceeds to block 132. At block 132, final rotation rate NRPM is compared to an up threshold Nu to determine whether or not NRPM is greater than or equal to Nu. The up threshold Nd is expressed as Nu=Ns+α. If this is the case (YES), the routine proceeds to block 134. At block 134, the first routine is executed to determine first rotation rate NRPM(A) as final rotation rate NRPM. If, at block 132, NRPM is less than Nu, the routine proceeds to block 130. At block 130, the second routine is executed to determine second rotation rate NRPM(C) as final rotation rate NRPM.

Figure 12:
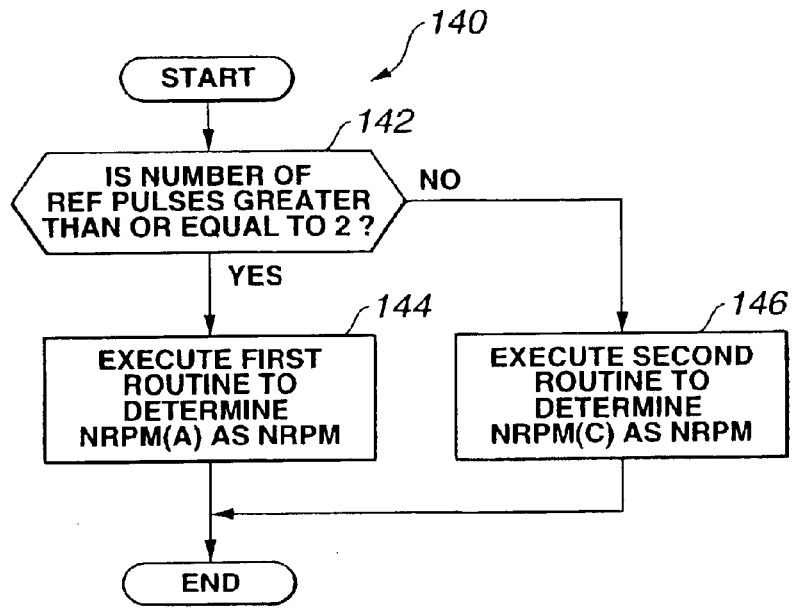
FIG. 12 is a flow diagram illustrating logic used to create the final rotation rate based on selective use of the first and second routines.

With reference to FIG. 12, engine start-up routine 140 is executed at regular intervals of 10 milliseconds.

In FIG. 12, at block 142, it is determined whether or not the number of input REF pulses is greater than or equal to 2. If this is the case (YES), the routine proceeds to block 144 At block 144, the first routine is executed to determine first rotation rate NRPM(A) as final rotation rate NRPM. If, at block 142, the number of input REF pulses is less than 2, the routine proceeds to block 146. At block 146, the second routine is executed to determine second rotation rate NRPM (C) as final rotation rate NRPM.

The start-up routine 140 may be used in association with control routine 110 or control routine 120.

From the preceding description, it will be appreciated that the rate detector and rate detection method provide enhanced velocity information, which, if used in a control algorithm for in-cylinder air mass calculation, would provide increased accuracy in computing the required control functions.

In the exemplary embodiments, the REF pulse stream is generated in response to the POS pulse stream. A sensor may be provided to output such stream of REF pulses.

In the exemplary embodiments, rotation sensor of the Hall IC type is used. The rotation sensor is not limited to this type. Anyone of other types may be used. One such example is a rotation sensor of the magnetic type. Other example is a rotation sensor of the photoelectric type.

While the present invention has been particularly described in conjunction with the exemplary embodiments, it is evident that many alternatives, modifications and variations will be apparent to those skilled in the art in light of foregoing description. It is therefore contemplated that the appended claims will embrace any such alternatives, modifications and variations as falling within the true scope and sprit of the present invention.

This application claims the priority of Japanese Patent Application No. P2001-058579, filed Mar. 2, 2001, the disclosure of which is hereby incorporated by reference in its entirety.

What is claimed is:

1. A rate detection method, comprising:
    generating interrupts in response to an input stream;
    storing first timer values of a first timer in response to said interrupts;
    setting a second timer to run from zero in response to said interrupts;
    sampling said stored first timer values to determine a first rate related to said input stream;
    sampling second timer value of said second timer to determine a second rate; and
    creating a final rate related to said input stream based on said first and second rates.

2. The rate detection method as claimed in claim 1, wherein:
    the step of creating includes:
        comparing said first rate to said second rate; and
        selecting one of said first and second rates as a final rate related to said input stream in response to said comparing result.

3. The rate detection method as claimed in claim 1, wherein:
    said input stream includes pulses related to rotation rate of a rotation device.

4. A rate detection method, comprising:
    generating first interrupts in response to a first input stream;
    generating second interrupts in response to a second input stream;
    storing first timer values in response to said first interrupts;
    storing second timer values in response to said second interrupts;
    executing a first routine, when selected, which includes sampling said stored first timer values to determine a first rate related to said first input stream as a final rotation rate;
    executing a second routine, when selected, which includes sampling said stored second timer values to determine a second rate related to said second input stream as said final rotation rate; and
    selecting one of said first and second routines.

5. The rate detection method as claimed in claim 4, wherein:
    said first input stream includes first pulses generated at first fixed regular angular intervals of each rotation; and
    said second input stream includes second pulses generated at second fixed regular angular intervals of each rotation.

6. A rate detector for a rotation device, comprising:
    a source outputting a stream of pulses related to rotation rate of a rotation device; and
    a programmable signal processor with interrupt input coupled to output of said source, said signal processor being programmed to
    store first timer values of a first timer in response to said interrupts;
    set a second timer to run from zero in response to said interrupts;
    sample said stored first timer values to determine a first rate related to said input stream;
    sample second timer value of said second timer to determine a second rate; and
    create a final rate related to said input stream based on said first and second rates.

7. A rate detector as claimed in claim 6, wherein:
    said signal processor is programmed to
        compare said first rate to said second rate; and
        select one of said first and second rates as a final rate related to said input stream in response to said comparing result in creating said final rate related to said input stream.

8. The rate detector as claimed in claim 6, wherein:
    said rotation device is an engine.

9. The rate detector as claimed in claim 8, wherein:
    said signal processor is programmed to:
        normally use said first rate as said final rate; and
        compare said first rate to said second rate and select a lesser one of said first rate and said second rate as said final rate only when the engine is being decelerated in an operating region of low engine speeds.

10. The rate detector as claimed in claim 8, wherein:
    said signal processor is programmed to:
        keep on creating said final rate even after a determination that the engine has come to a stall.

11. The rate detector as claimed in claim 10, wherein:
    said signal processor is programmed to:
        determine said second rate at predetermined fixed regular time intervals.

12. A rate detector for a rotation device, comprising:
    a source outputting a stream of first pulses related to rotation rate of a rotation device;
    a rotation sensor coupled to said rotation device, said rotation sensor outputting a stream of second pulses related to rotation rate of said rotation device;

a programmable signal processor with first interrupt input coupled to output of said source and also with second interrupt input coupled to output of said rotation sensor, said signal processor being programmed to:
  store first timer values in response to said first interrupts;
  store second timer values in response to said second interrupts;
  execute a first routine, when selected, which includes sampling said stored first timer values to determine a first rate related to said first input stream as a final rotation rate;
  execute a second routine, when selected, which includes sampling said stored second timer values to determine a second rate related to said second input stream as said final rotation rate; and
  select one of said first and second routines.

13. The rate detector as claimed in claim 12, wherein:
said stream of first pulses has one pulse per rotation of said rotation device through a first predetermined number of angles;
said stream of second pulses has one pulse per rotation of said rotation device through a second predetermined number of angles.

14. The rate detector as claimed in claim 13, wherein:
said rotation device is an engine.

15. The rate detector as claimed in claim 14, wherein:
said signal processor is programmed to:
  select said second routine when the engine is operating in an operating region of low engine speeds; and
  select said first routine when the engine is operating in an operating region of high engine speeds.

16. The rate detector as claimed in claim 14, wherein:
said signal processor is programmed to:
  compare said final rotation rate determined by executing said first routine to a threshold to newly select one of said first and second routines.

17. The rate detector as claimed in claim 14, wherein:
said signal processor is programmed to:
  establish a threshold;
  compare said final rotation rate, determined by executing said selected one of said first and second routines, to said threshold to newly select one of said first and second routines.

18. The rate detector as claimed in claim 14, wherein:
said signal processor is programmed to:
  establish a first threshold and a second threshold, said first threshold being greater than said second threshold;
  compare said final rotation rate, determined by executing selected one of said first and second routines, to said first threshold to newly select said first routine when said final rotation rate is greater than or equal to said first threshold, and to newly select said second routine when said final rotation rate is less than said first threshold;
  compare said final rotation rate, determined by executing selected one of said first and second routines, to said second threshold, when the engine is being decelerated, to newly select said first routine when said final rotation rate is greater than or equal to said second threshold, and to newly select said second routine when said final rotation rate is less than said second threshold.

19. The rate detector as claimed in claim 14, wherein:
said signal processor is programmed to:
  compare a number of first pulses to a threshold;
  select said second routine when said number of first pulses is less than said threshold; and
  select said first routine when said counted number of first pulses is greater than or equal to said threshold.

* * * * *